(12) United States Patent
Cho

(10) Patent No.: US 6,219,038 B1
(45) Date of Patent: Apr. 17, 2001

(54) WATER RESISTANT TOUCH PAD FOR AN ELECTRONIC APPARATUS

(75) Inventor: Keon-Young Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/129,845

(22) Filed: Aug. 6, 1998

(30) Foreign Application Priority Data

Aug. 6, 1997 (KR) .................................................. 97-37640

(51) Int. Cl.[7] ...................................................... G09G 5/00
(52) U.S. Cl. ............................ 345/173; 345/169; 200/305
(58) Field of Search ..................................... 345/156, 157, 345/173, 169, 168, 166, 163; 341/22; 178/18.01, 18.03, 18.04, 18.5–18.1, 20.01, 18.05, 18.08; 200/305, 302

(56) References Cited

U.S. PATENT DOCUMENTS

| | | |
|---|---|---|
| 4,225,970 * | 9/1980 | Jaramillo et al. ...................... 455/89 |
| 4,396,830 | 8/1983 | Isozaki et al. . |
| 5,021,638 * | 6/1991 | Nopper et al. ................... 235/145 R |
| 5,180,237 | 1/1993 | Chen . |
| 5,300,742 | 4/1994 | Huang . |
| 5,340,955 * | 8/1994 | Calvillo et al. ................... 200/302.2 |
| 5,355,148 | 10/1994 | Anderson . |
| 5,508,719 | 4/1996 | Gervais . |
| 5,572,205 | 11/1996 | Caldwell et al. . |
| 5,626,222 | 5/1997 | Aguilera . |
| 5,896,453 * | 6/1999 | Speaks ................................ 379/433 |
| 5,914,702 * | 6/1999 | Derocher et al. .................... 345/157 |

* cited by examiner

Primary Examiner—Vijay Shankar
Assistant Examiner—Mansour M. Said
(74) Attorney, Agent, or Firm—Robert E. Bushnell, Esq.

(57) ABSTRACT

A touch pad device is used to guide a pointing device on a display device of an electronic appliances or apparatus. A sealing sheet, such as a soft rubber sheet, is interposed between the housing of an electronic apparatus and the touch pad device, thus resisting the introduction of liquid and gases into the apparatus housing.

9 Claims, 5 Drawing Sheets

WATER RESISTANT TOUCH PAD FOR AN ELECTRONIC APPARATUS

CLAIM OF PRIORITY

This application makes reference to, incorporates the same herein, and claims all rights accruing thereto under 35 U.S.C. § 119 through my patent application entitled Waterproof Touch Panel Device and Portable Computer With the Same earlier filed in the Korean Industrial Property Office on Aug. 6, 1997 and there duly assigned Ser. No. 1997/37640.

BACKGROUND OF THE INVENTION

1. Field of the Invention

The present invention relates to a touch pad device used to guide a pointing device displayed on a display panel of an electronic apparatus and, more specifically, to a touch pad device for use with electronic devices, such as a computer system or portable computer, that is liquid resistant.

2. Background Art

To allow users to more effectively, easily and conveniently use a variety of electronic appliances, such as television sets, computers and audio systems, it is preferable that the electronic appliances have display panels that allow a user to select various functions or commands via a display panel. To properly select various functions, which can be displayed in an icon fashion on a display panel, a cursor type of icon is necessary to allow the user select individual function icons. Various devices have been developed to allow a user to control a pointing device on a display panel.

One method of controlling on screen cursors is to use a keyboard. Some techniques for constructing keyboards that can control an on screen cursor are shown, for example, in U.S. Pat. No. 4,396,830 to Isozaki entitled Waterproof Keyboard Device, U.S. Pat. No. 5,300,742 to Huang entitled Waterproof Structure for Computer Key Switch, U.S. Pat. No. 5,626,222 to Aguilera entitled Force Controllable Shielded Mechanical Switch Actuators, and U.S. Pat. No. 5,180,237 to Chen entitled Keyboard for Under Water Use.

Another method of controlling on screen cursors is by using touch control systems, similar to that detailed, for example, in U.S. Pat. No. 5,572,205 to Caldwell entitled Touch Control System. An improved method of controlling on screen cursors is the 'mouse' that allows a user to more easily move a cursor on a display panel. An advanced form of a 'mouse' is shown, for example, in U.S. Pat. No. 5,355,148 to Anderson entitled Fingerpoint Mouse. A more recent development in cursor control devices is the pointing stem. One type of pointing stem is shown, for example, in U.S. Pat. No. 5,508,719 to Gervais entitled Pressure-Actuated Pointing Device.

Another development that has occurred in efforts to replace the mouse is the development of a touch pad. The touch pad consists of a rectangular pad whose surface is mapped to correspond to the display panel. By touching a location on the touch pad, the computer user directs the computer to move the cursor to the corresponding location on the display panel. In addition, touch pads have been used to allow easy and reliable input into electronic appliances. Such touch pad devices have also been used with electronic appliances having liquid crystal displays or cathode ray tubes, such as the portable computer mentioned above.

The touch pads of the contemporary art do not always resist liquid well enough to prevent a user from damaging an electrical apparatus due to operating the touch pad with wet fingers or otherwise allowing liquid to come into contact with the touch pad. As such, I believe that it may be possible to improve on the contemporary art by providing a touch pad that is resistant to liquids, that prevents damage to electrical devices, that is usable with computer systems, that is economical to manufacture, that requires few manufacturing steps to produce, and that is useful with a variety of electronic devices.

SUMMARY OF THE INVENTION

Accordingly, it is an object of the present invention to provide an improved touch pad.

It is another object to provide a touch pad that is resistant to liquids.

It is still another object to provide a touch pad that prevents damage to electronic devices.

It is yet another object to provide a touch pad that is usable with computer systems, either as a component for a peripheral, or a keyboard, or a portable computer.

It is still yet another object to provide a touch pad that is useable with a variety of electronic devices.

It is a further object to provide a portable computer using a liquid resistant touch pad.

It is a still further object to provide a touch pad that is well suited to use in medical equipment or in a hospital environment, where exposure to fluids is a predictably common occurrence.

It is a still further object to provide a touch pad that can also resist some gaseous contaminants.

To achieve these and other objects, a liquid resistant touch pad device for electronic appliances may be constructed using a touch pad that is electrically connected to a system printed circuit board, or a central processing unit, of an electric appliance via a cable. The touch pad consists of a rectangular pad whose surface is mapped to correspond to the display panel. By touching a location on the touch pad, the computer user directs the computer to move the cursor to the corresponding location on the display panel. A brace has a seating surface for mounting the touch pad and associated buttons that allow a user to execute a function or command by activating one or a combination of buttons. Both the touch pad and the buttons are exposed to the surrounding atmosphere around the electronic apparatus via openings in the apparatus housing. A button printed circuit board is electrically connected to the system printed circuit board and positioned under the buttons, to generate signals that are sent to the system printed circuit board when a button is activated.

To create a liquid resistant seal between the touch pad device and the apparatus housing a sealing sheet is laid on the brace. By interposing a sealing sheet between the touch pad and the housing liquid can be prevented from entering into the apparatus housing via the touch pad. This reduces the concern of a user that is either transporting the electronic apparatus through a wet environment or using the electronic apparatus in a wet environment.

A brace is used to support both the touch pad and buttons and is then mounted to the apparatus housing. A brace may be constructed using a plate that has a seating surface on which the touch pad can be attached. In addition, rounded side walls can be extended from opposite sides of the seating surface to minimize surface area. Button holes, or bores, are formed in the plate to accommodate buttons that are moveable in a vertical direction. At least one rib may be formed in the apertures in the brace that secure the buttons. The ribs prevent the button from being pushed through the brace when a user is operating the buttons.

The sealing sheet may be constructed using a base that has an aperture allowing the top side of the touch pad to be exposed to the outside of the apparatus housing. The base covers the edges of the touch pad to form a pad edge cover that seals the space between the touch pad and the housing. In addition, the sealing sheet has button covers that prevent liquid from entering the housing via the openings for the buttons. To help simplify the positioning of the sealing sheet against the inner surface of the housing, a pair of guide projections are formed on the inner surface of the apparatus housing. A pair of perforations are located in the sealing sheet, that allow the guide projections to be snugly inserted into the sealing sheet, thus properly aligning the sealing sheet.

The inventive touch pad can be used with portable computers, or with a keyboard, or with a stand alone peripheral. In addition, the touch pad of the present invention can be used with any electronic apparatus that can utilize the signal input from the touch pad, such as a blender, a television, a video cassette recorder, medical equipment, an oscilloscope, or an adjustable bed.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
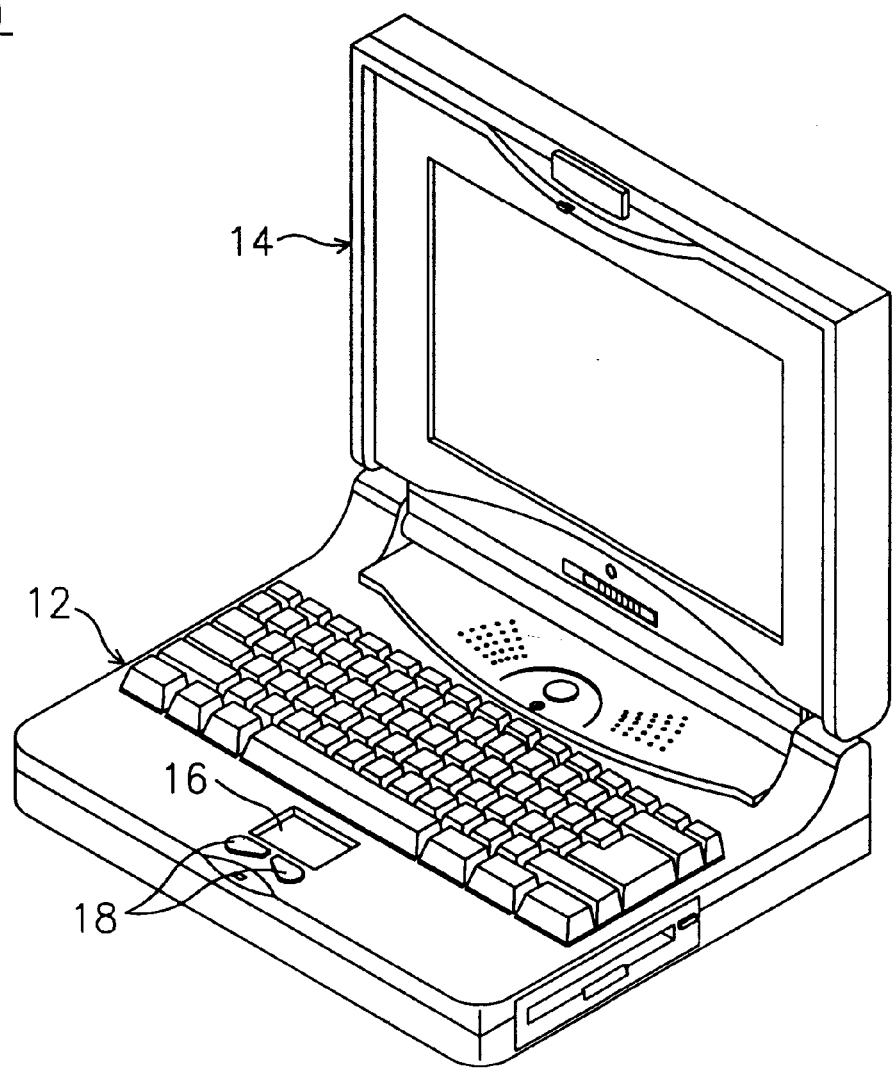
FIG. 1 is a perspective view of a portable computer with a touch pad device.

Turning now to the drawings, FIG. 1 illustrates a portable computer with a touch pad device that is used as a pointing device. The touch pad consists of a rectangular pad whose surface is mapped to correspond to the display panel. By touching a location on the touch pad, the computer user directs the computer to move the cursor to the corresponding location on the display panel. Touch pad device 16 is positioned on main body, or housing, 12 of portable computer 10. As is well known, main body 12 may also house a keyboard, a floppy disk drive, etc. The touch pad device is electrically connected to the a central processing unit, or system printed circuit board, and may be constructed using touch pad 16 and a buttons 18. Touch pad 16 is used for moving a cursor between a plurality of icons shown on display panel 14 that is hinged to main body 12. Display panel 14 is a flat display, such as a plasma display or a liquid crystal display. Buttons 18 are used for executing commands or functions when they are activated by a user.

Figure 2:
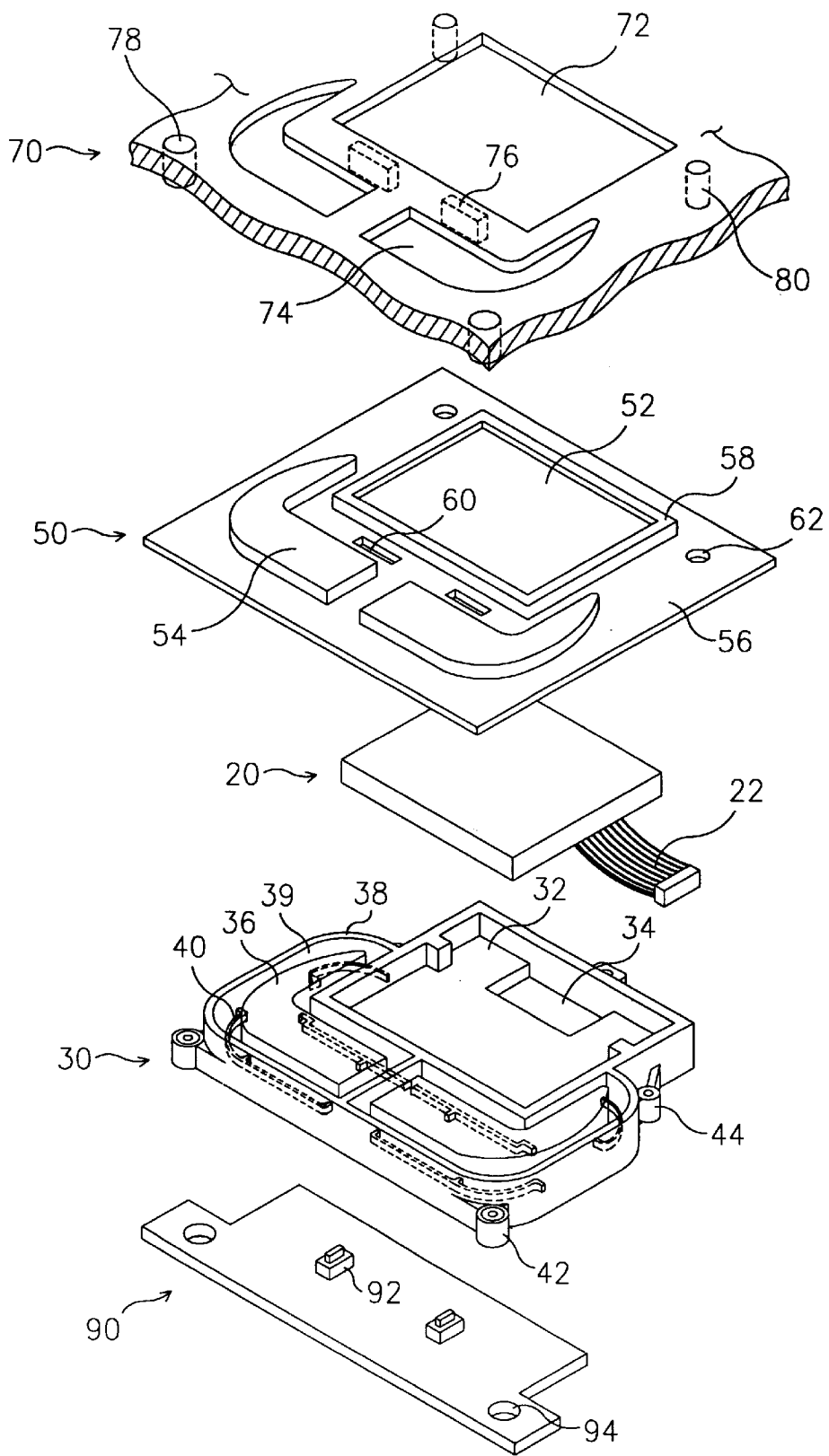
FIG. 2 is an exploded perspective view of a liquid resistant touch pad device for an electronic apparatus as constructed according to the principles of the present invention.

A liquid resistant touch pad as constructed according to the principles of the present invention is shown in FIG. 2. This inventive touch pad can be used with portable computers, or with a keyboard, or with a stand alone peripheral. In addition, the touch pad of the present invention can be used with any electronic apparatus that can utilize the signal input from the touch pad, such as a blender, a television, a video cassette recorder, medical equipment, an oscilloscope, or an adjustable bed. The liquid resistant touch pad may be constructed using touch pad 20 and buttons 36. Touch pad 20 is electrically connected to the system printed circuit board, or central processing unit or controller, of an electric apparatus or appliance and is used as a pointing device for moving a cursor between various points on a display panel. Buttons 36 may be used for executing a command of function when the button are pressed either alone or in combination. Touch pad 20 may be manufactured as a pre-assembled body with cable 22. Cable 22 is connected to the system printed circuit board of the electronic appliance. Button printed circuit board 90 is positioned under buttons 36 and is connected to the system printed circuit board of the electronic appliance. Button printed circuit board, or simple switch, 90 generates electric signals in cooperation with buttons 36 when the buttons are depressed and brought into contact with the button printed circuit board.

Both touch pad 20 and buttons 36 are seated on brace 30. Brace 30 has seating surface 32 for mounting touch pad 20 and bores that accommodate buttons 36. Brace 30 is set in apparatus housing 70 of the electric appliance in a manner that exposes both pad 20 and buttons 36 to the atmosphere outside of apparatus housing 70 through openings 72 and 74, respectively. Seating surface 32 for touch pad 20 has hole 34 for allowing cable 22 to pass through the brace to be connected to the system printed circuit board.

Button holes, or bores, 39 accommodate buttons 36, while allowing the buttons to be moveable in a vertical direction. Each hole has at least one rib 40 located horizontally inside of the hole to prevent button 36 from being pushed through brace 30 when depressed by a user.

To prevent the unexpected introduction of liquids or gases from the atmosphere outside of apparatus housing 70, sealing sheet 50 is laid on the top of brace 30 to be interposed between the brace, after touch pad 20 has been engaged with the brace, 30 and apparatus housing 70. Sealing sheet 50 is designed to allow a user to freely operate both touch pad 20 and buttons 36, that are seated on brace 30 and are projected through apparatus housing 70 through openings 72 and 74. Sealing sheet 50 may be constructed economically and can be retrofitted onto existing touch pads. Sealing sheet 50 may be constructed using base 56, that may have a rectangular shape. Base 56 has aperture 52 that allows the top side of touch pad 20 to be exposed to the outside of apparatus housing 70 and button covers 54 for covering buttons 36. Aperture 52 has edges that cover the edges of touch pad 20 to form a seal around the edges of touch pad 20. This forms a liquid and gaseous resistant seal around the touch pad forming a pad edge covering 58. To facilitate the easier placement of sealing sheet 50, along with the covered brace 30 and touch pad 20, against the inner surface of apparatus housing 70, at least one guide projection 76, having a predetermined length, is formed on the inner surface of apparatus housing 70. A corresponding perforation 60 is formed in the sealing sheet that snugly fits around the guide projections.

Touch pad device 20 is set in apparatus housing 70 by attaching the brace to the inner surface of the apparatus housing. Brace 30 has a multitude first bosses 42 and second bosses 44 positioned along the brace. Button printed circuit board, or simple switch, 90 is positioned at a position corresponding to first bosses 42 of brace 30, thus properly aligning the button printed circuit board under buttons 36. The inner surface of apparatus housing 70 has third and fourth bosses 78 and 80 at positions corresponding to first and second bosses 42 and 44 of brace 30. Thus allowing the combination of the brace and the button printed circuit board to be fastened to the apparatus housing. Sealing sheet 50 also has bores 62 in base 56 at positions corresponding to second bosses 44 of brace 30. Both button printed circuit board 90 and brace 30 are attached to system housing 70 by a plurality of fasteners, that pass through both holes 94 of button printed circuit board 90 and first bosses 42 of brace 30 prior to being threaded into third bosses 78 of apparatus housing 70. Thus, it is possible to stably position button printed circuit board 90 under buttons 36 that are seated in brace 30. Both the rear portion of brace 30 and sealing sheet 50 are attached to apparatus housing 70 by fasteners, that pass through both second bosses 44 of brace 30 and holes 62 of sealing sheet 50 prior to being threaded into fourth bosses 80 of apparatus housing 70.

Figure 3:
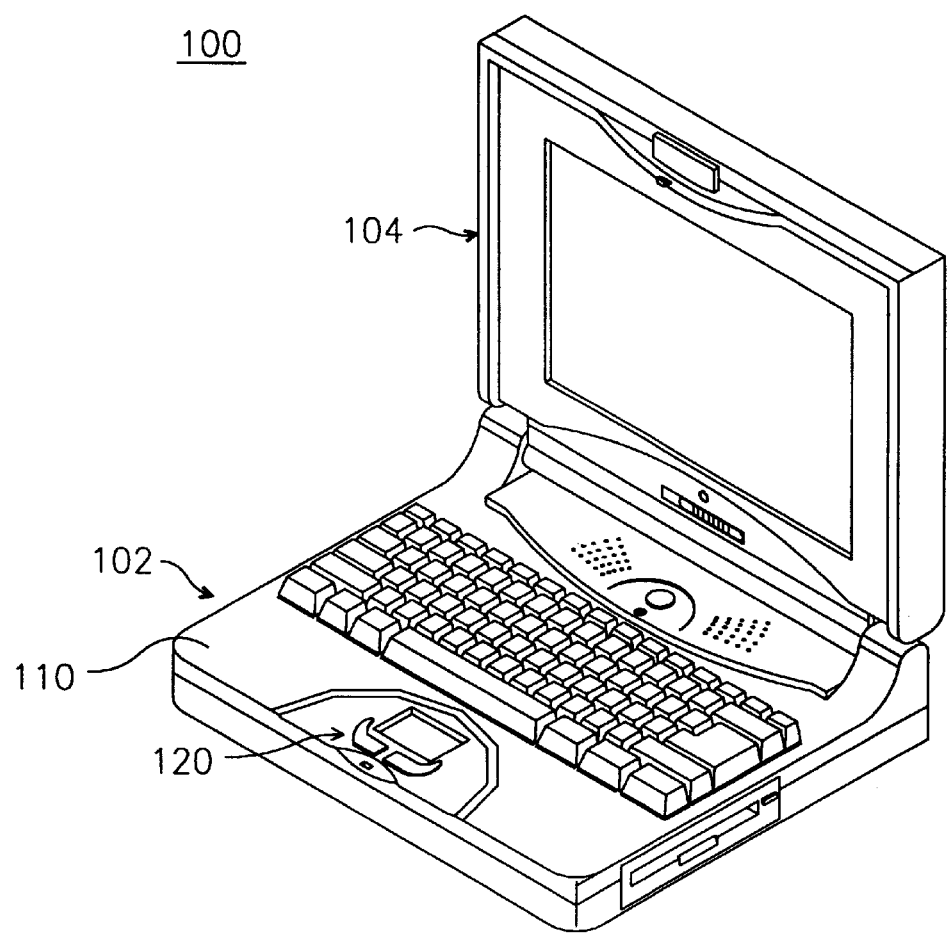
FIG. 3 is a perspective view of a portable computer with the liquid resistant touch pad of FIG. 2.

The touch pad device of the present invention is preferably used with portable computer 100, also referred to as a laptop computer, a notebook computer, or a palmtop computer, as shown in FIG. 3. Portable computer 100 may be constructed using main body 102 and display panel 104. Main body 102 encloses a central processing unit, or controller, (not shown) that drives display panel 104, that is hinged to main body 102. Display panel 104 uses a flat display, such as a plasma display or a liquid crystal display. Touch pad device 120 of this invention is located on main body 102 of computer 100 proximate to the keyboard, thus allowing a user to easily operate the touch pad.

Figure 4:
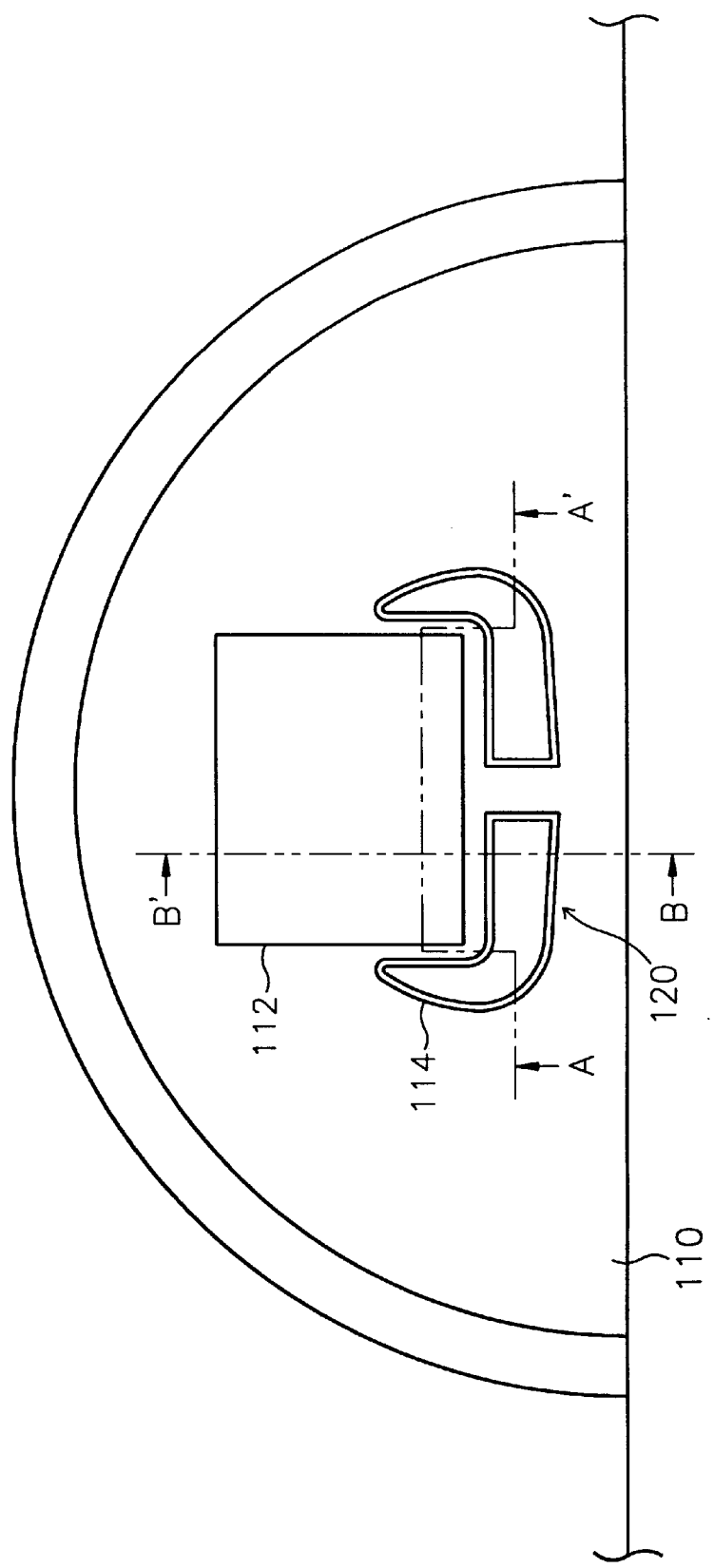
FIG. 4 is a plan view of the touch pad device of FIG. 3.
Figure 5:
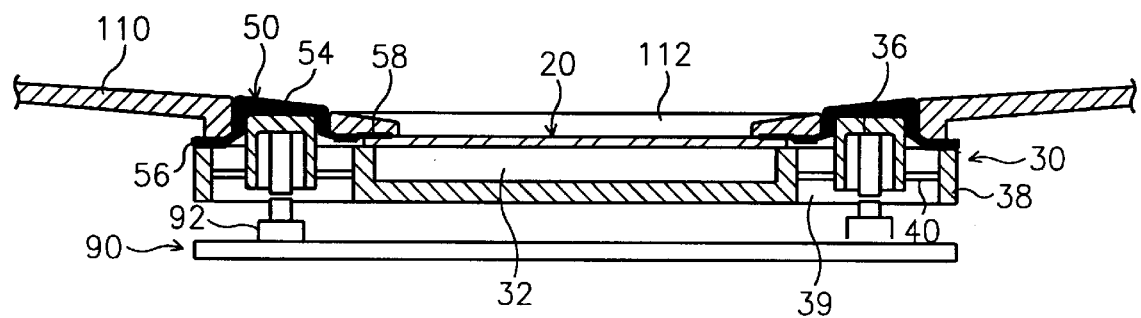
FIG. 5 is a cross-sectional view of the touch pad device of FIG. 4 as taken along the line A–A'.
Figure 6:
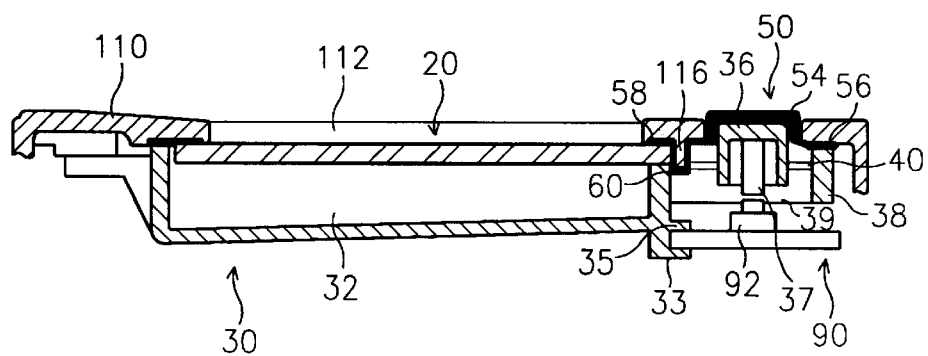
FIG. 6 is a cross-sectional view of the touch pad of FIG. 4 as taken along the line B–B'.

FIG. 4 is a plan view of touch pad device 120 mounted in the portable computer of FIG. 3. FIGS. 5 and 6 are cross-sectional views of the touch pad device of FIG. 4 taken along the lines A–A' and B–B', respectively. As shown in both FIGS. 5 and 6, touch pad device 120 may be constructed using touch pad 20, brace 30, sealing sheet 50 and button printed circuit board 90. Which together are collectively mounted to the inner surface of housing 110 of the computer's main body 102. The housing 110 forms the top wall of main body 102 and has first and second openings 112 and 114.

As detailed in FIG. 5, touch pad device 120 is set in housing 110 of computer 100 with touch pad 20, of touch pad device 120, seated on seating surface 32 of brace 30. Touch pad 20 is exposed to the atmosphere outside of housing 110 through first opening 112, thus allowing a user to freely operate touch pad 20. Sealing sheet 50 is interposed between brace 30 and apparatus housing 110, with the sealing sheet forming an edge covering 58 around touch pad 20. When touch pad device 120 is set in housing 110 of computer 100, buttons 36 of touch pad device 120 are projected through housing 110 through openings 114, thus allowing a user to easily operate buttons 36. Buttons 36 project from housing 110 and are covered by button covers 54 of sealing sheet 50. Base 56 of sheet 50 is compressed by housing 110 around button covers 54, thus resisting the introduction of liquids or gases into housing 110 through second opening 114.

Button printed circuit board 90 generates electric signals in response to the operation of buttons 36. Terminal 37 is positioned underneath both buttons 36, while switch 92 is located on button printed circuit board 90 at a position corresponding to terminal 37. When a user presses either of buttons 36, that are covered by button covers 54 of sealing sheet 50, terminal 37 comes into contact with switch 92 causing button printed circuit board 90 to generate an electric signal.

To mount touch pad device 120 of this invention in housing 110, touch pad 20 is seated on seating surface 32 of brace 30 prior to covering brace 30 with sealing sheet 50. The combination of brace 30, touch pad 20, buttons 36, and sealing sheet 50, are fastened to the inner surface of housing 110. Brace 30 is positioned on housing 110 with guide projections 116 of housing 110 aligned with perforation 60 of sealing sheet 50 prior to fastening brace 30 to top housing 110. Thus, it is possible to more precisely position touch pad device 120 relative to housing 110. Button printed circuit board 90 is positioned under buttons 36 of brace 30. Terminals 37 of buttons 36 are aligned with switches 92 of button printed circuit board 90. To hold button printed circuit board 90 under buttons 36, first and second ribs 33 and 35 are formed on brace 30 with a groove formed between the two ribs. One edge of button printed circuit board 90 is closely fitted into the groove between two ribs 33 and 35, thus stably holding button printed circuit board 90 in brace 30.

As described above, the touch pad device as constructed according to the principles of the present invention, is used to guide a pointing device on a display device of an electronic appliances or apparatus. A sealing sheet, such as a soft rubber sheet, is interposed between the housing of an electronic apparatus and the touch pad device, thus resisting the introduction of liquid and gases into the apparatus housing.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. In an apparatus having a touch pad that is liquid resistant, said apparatus comprising:

a housing accommodating a display panel and having a plurality of openings;

said touch pad disposed in said housing and accessible via said openings for transforming tactile pressure on said touch pad into movement of a cursor on said display panel;

a brace engaged with said touch pad for securing said touch pad to said housing, said brace comprising:
a seating surface for supporting said touch pad; and
a plurality of buttons attached to said brace for the tactile entry of a plurality of function commands into said apparatus;

a board attached to said brace and bearing switches to generate signals when said buttons are activated;

the improvement comprising:
a sealing sheet interposed between said brace, after said touch pad is engaged with said brace, and said housing to form a seal, said sealing sheet comprising:
a base having an aperture through which portions of said touch pad are accessible, said base forming said seal around said edges of said touch pad; and
a plurality of button covers covering said buttons of said brace; and said touch pad being covered with said sealing sheet and then attached to said housing, said sealing sheet providing said seal around said touch pad, said buttons, and said openings to resist the entry of liquids into said apparatus housing.

2. The apparatus of claim 1, wherein said brace further comprises:
   said base having a plurality of bores each surrounding one of said buttons; and
   at least one rib attached to said apertures to secure said buttons inside of said apertures, thus allowing the buttons to be vertically movable while maintaining said buttons inside said apertures.

3. The apparatus of claim 1, said apparatus further comprising:
   a guide projection mounted on said inner surface of said apparatus housing; and
   said sealing sheet having a perforation in said base that fits tightly around said guide projection, thus allowing said sealing sheet to be precisely mounted relative to said apparatus housing.

4. The device of claim 1, said device further comprising:
   a guide projection mounted on said inner surface of said housing; and
   said sealing sheet having a perforation in said base that fits tightly around said guide projection, thus allowing said sealing sheet to be precisely mounted relative to said apparatus housing.

5. A portable computer, comprising:
   a housing accommodating a display panel and having an opening;
   a touch pad device disposed in said housing and accessible via said opening for transforming tactile pressure on said touch pad device into movement of a cursor on said display panel;
   a brace, comprising:
      a seating surface for engaging and supporting said touch pad device; and
      a plurality of buttons attached to said brace to allow the tactile entry of a plurality of function commands into said portable computer; and
         a button printed circuit board attached to the brace and adapted to generate signals when the buttons are activated;
   a sealing sheet interposed between portions of said touch pad device and said housing to form a seal that prevents the entry of liquids into said housing, said sealing sheet comprising:
      a base having an aperture through which said top side of said touch pad device is exposed, said base also forming said seal around said edges of said touch pad device; and
      a plurality of button covers covering said buttons of said brace.

6. The portable computer of claim 5, said portable computer further comprising:
   a guide projection mounted on said inner surface of said housing; and
   said sealing sheet having a perforation in said base that fits tightly around said guide projection, thus allowing said sealing sheet to be precisely mounted relative to said apparatus housing.

7. A peripheral device for a computer system, said peripheral device comprising:
   a housing accommodating a display panel and a peripheral device and having an opening;
   a touch pad device disposed in said housing and accessible via said opening for transforming tactile pressure on said touch pad device into movement of a cursor on said display panel, said touch pad device further comprising:
      a brace, comprising:
         a seating surface for engaging and supporting said touch pad device;
         a plurality of buttons attached to said brace to allow the tactile entry of a plurality of function commands into said computer system; and
         a button printed circuit board attached to said brace to generate signals when said buttons are activated;
   a sealing sheet interposed between portions of said touch pad device and said housing to prevent the entry of liquids into said housing, said sealing sheet comprising:
      a base having an aperture through which said top side of said touch pad device is exposed, said base also forming said seal around said edges of said touch pad device; and
      a plurality of button covers covering said buttons of said brace.

8. A portable computer, comprising:
   a housing accommodating a display panel and having an opening;
   a touch pad device disposed in said housing and accessible through said opening for transforming pressure on said touch pad device into movement of a cursor on said display panel;
   a brace attached to said touch pad device for securing said touch pad to said housing, said brace comprising:
      a seating surface for supporting said touch pad device; and
      a plurality of buttons attached to said brace to enter a plurality of function commands into said portable computer;
   a sealing sheet interposed between portions of said touch pad device and said housing to form a seal that prevents the entry of liquids into said housing, attached to said brace, a button printed circuit board for generating signals when said buttons are activated; and
   said sealing sheet further comprising:
      a base having an aperture through which said top side of said touch pad device is exposed, said base also forming said seal around said edges of said touch pad device; and
      a plurality of button covers covering said buttons of said brace.

9. The portable computer of claim 8, said portable computer further comprising:
   a guide projection mounted on said inner surface of said housing; and
   said sealing sheet having a perforation in said base that fits tightly around said guide projection, thus allowing said sealing sheet to be precisely mounted relative to said apparatus housing.

* * * * *